Figure 1:
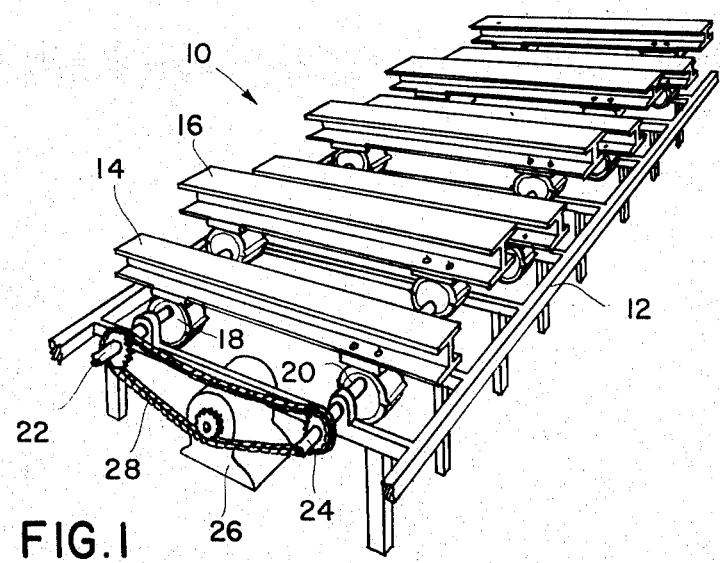

United States Patent [19]
Erb

[11] 3,776,351
[45] Dec. 4, 1973

[54] WALKING BEAM CONVEYOR AND ECCENTRIC CONSTRUCTION THEREFOR

[76] Inventor: Wick D. Erb, c/o City Machine and Welding Co., 448 Andrews Ave., Youngstown, Ohio 44505

[22] Filed: Mar. 26, 1971

[21] Appl. No.: 128,376

[52] U.S. Cl. .................................. 198/219, 74/570
[51] Int. Cl. ............................................ B65g 25/04
[58] Field of Search .................... 198/219, 220 DA, 198/220 BA; 74/570, 86

[56] References Cited
UNITED STATES PATENTS

| | | | |
|---|---|---|---|
| 736,847 | 8/1903 | Harling | 74/570 |
| 872,922 | 12/1907 | Fleming | 74/570 |
| 1,343,373 | 6/1920 | Pedersen | 198/219 |

Primary Examiner—Richard E. Aegerter
Assistant Examiner—Douglas D. Watts
Attorney—Peter L. Klempay

[57] ABSTRACT

The invention relates to a walking beam conveyor and an improved eccentric construction therefor. The conveyor consists of a series of parallel extending beams each of which are connected to two shafts by eccentrics with alternate ones of the beams being connected in a 180° phase relationship. The eccentric units each consist of upper and lower eccentric housings which are provided with interlocking means and an eccentric keyed to the shaft and received within the housing. Spring retaining rings are employed to retain the eccentric within the housing and to retain the housing sections in aligned relationship. Nylon bearing pads are also provided in the housings and are retained by the snap rings.

9 Claims, 5 Drawing Figures

PATENTED DEC 4 1973

3,776,351

INVENTOR.
WICK D. ERB

BY Peter L. Hlenpay
AGENT

WALKING BEAM CONVEYOR AND ECCENTRIC CONSTRUCTION THEREFOR

Walking beam conveyors are widely used in the metal processing and fabricating industries to move formed metallic lengths at right angles to their principle dimension while maintaining a separation or spacing between the individual formed lengths. These conveyors consist of a plurality of beam-like supporting members which extend at right angles to the principle length of the formed metal elements and each of which are connected by eccentrics to rotating shafts. Adjacent beam members are connected 180° out of phase with one another so that alternate ones of the plurality of beam-like members support and move the formed metal elements during half cycles of the rotation of the shafts.

In such conveyor systems there is a need for an eccentric construction which is of low cost, high durability, and which is easily serviced.

It is the primary object of the present invention to provide an eccentric construction for a walking beam conveyor table which achieves the above desired results.

It is a further object of the present invention to provide a walking beam conveyor table system in which the eccentrics are connected to the beam members in such a manner that the failure of the drive means for one of the rotating shafts results in no damage to the beam elements of the conveyor system.

Another object of the invention is the provision of an eccentric construction for a conveyor system in which the principle components of the eccentric and eccentric housing may be formed of aluminium extrusions, minimizing the cost of the eccentric construction.

Yet another object of the invention is the provision of an eccentric construction which employs renewable bearing members, permitting the rapid replacement of worn or damaged members.

It is also an object of the present invention to provide an eccentric construction in which the eccentric housing is easily assembled and disassembled without requiring a major disassembly of the entire conveyor system.

The above and other objects of the invention which will become apparent in the following detailed description are achieved by providing a conveyor system and an eccentric construction therefor in which parallel supporting beams are connected in alternate manner by eccentrics to a driven shaft with alternate beams being 180° out of phase, and in which the eccentric construction consists of an eccentric keyed to a shaft, upper and lower housing sections receiving the eccentric with the upper section supporting the beam member of the conveyor and the upper and lower sections having interlocking end portions. The eccentric is supported in the housing by renewable, preferably nylon, bearing members and internal snap rings are employed to secure the housings together and to retain the bearing member and the eccentric within the housing.

For a more complete understanding of the invention and the object and advantages thereof reference should be had to the following specification and the accompanying drawings wherein there is shown a preferred embodiment of the invention.

Figure 2:
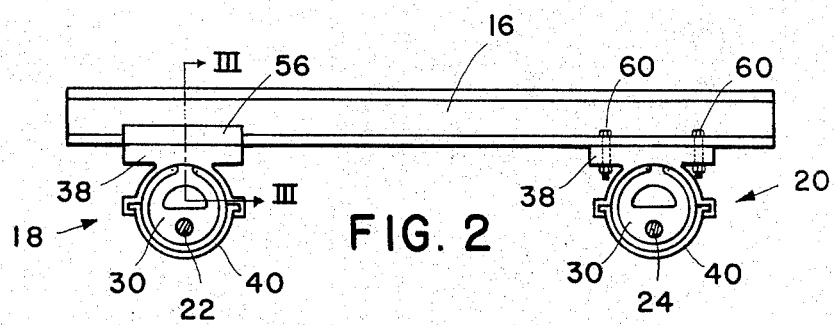
Figures 3, 4, 5:
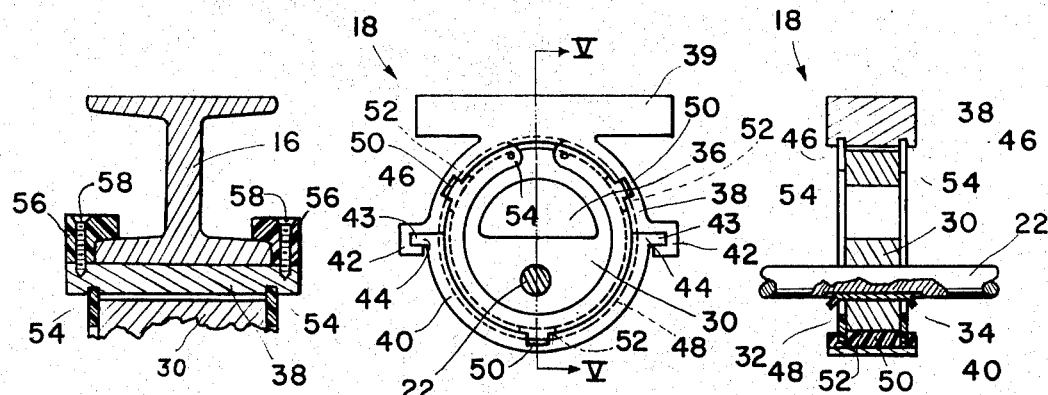

FIG. 1 is a pictorial view of a walking beam conveyor;
FIG. 2 is a fragmentary transverse sectional view of the conveyor of FIG. 1;
FIG. 3 is a fragmentary sectional view taken along the line III—III of FIG. 2;
FIG. 4 is an end elevational view of the eccentric employed in the conveyor of FIG. 1; and
FIG. 5 is a sectional view taken along the line V-V of FIG. 4.

Referring now to the drawings and particularly to FIG. 1 there is shown a walking beam conveyor, designated generally by the reference numeral 10. The conveyor 10 is provided with a frame 12. Two series of beams 14 and 16 are mounted on eccentric assemblies 18 and 20 which are carried by shafts 22 and 24, respectively, supported by the frame 12. As will be described in more detail below, each of the eccentric assemblies comprises a housing which is affixed to the beam 14 or 16 and an eccentric which is keyed to the respective shafts 22 or 4. The two shafts 22 and 24 are rotated in unison, for example, by the motor 26 and chain drive 28. All of the eccentrics supporting the beams of the first series 14 are in exact alignment with one another while the eccentrics associated with the beams of the series 16 are keyed to their respective shafts in a position 180° of out phase with the eccentrics associated with the beams 14. It can be seen that when the shafts 22 and 24 are rotated in the clockwise direction, when viewed from the forward end of the conveyor as shown in FIG. 1, the beams 14 and 16 will move in a circular oscillating path to convey elongated articles received at the left side of the conveyor in parallel alignment with the shafts 22 and 24 toward the right side of the conveyor. The series of beams 14 or 16 which is in the upper half circle of its oscillating path will support the elongated articles and move these articles toward the right. As this series of beams passes to the lower half circle of its oscillating path the alternate series of beams will be passing to the upper half circle of its path and will then support and move the elongated articles.

It will be understood that while the eccentric assembly is described with particular reference to a walking beam conveyor, the invention is not so limited. The eccentric assembly may obviously be used with other equipment.

Referring now to FIGS. 4 and 5 the construction of the eccentric assemblies will be described. While the eccentric assembly 18 is illustrated it will be understood that the assembly 20 is of identical construction. The eccentric 30 is secured to its drive shaft 22 by a key 32 which is preferably of greater length than the thickness of the eccentric 30 so that the ends of the key 32 may be slotted to provide tab-like portions 34 which may be bent away from the shaft 22 after the eccentric has been installed and positioned, as indicated in FIG. 5, to securely anchor the eccentric and key to the shaft. The eccentric 30 is received in a housing comprised of upper and lower housing sections 38 and 40, respectively. The upper housing portion 38 includes a flat top section 39 on which is supported the conveyor beam 14 or 16. The housing portion 38 defines the upper half of the eccentric housing and terminates at its lower end with outwardly projecting portions 42 which are of C-shaped configuration in the plane perpendicular to the axis of the shaft 22, having radially inwardly opening grooves 43. The grooves 43 extend the full thickness of the housing portion in parallel alignment with the axis of rotation of the eccentric. The lower housing portion 40 is provided at its upper ends with outwardly projecting portions 44 which are slideably received in the slots 43. When the two housing sections 38 and 40 are assembled they define a circular opening of slightly larger diameter than the external diameter of the eccentric.

The radially inner surface of the lower housing 40 is provided with a slot 50 extending the entire thickness of the housing. The upper housing section 38 is likewise provided with identical slots 50 each located 60° from the vertical. Bearing plates 52, preferably made of nylon, are received in each of these slots for engaging the circumference of the eccentric 30.

The two housing sections 38 and 40 are provided on their inner cylindrical face with a pair of annular grooves 46 and 48 immediately adjacent the opposite end faces of the eccentric 30. These grooves receive internal snap rings 54 which serve to hold the housing halves 38 and 40 together and to retain the bearing plates 52 in position. These snap rings 54 are preferably made of nylon and may, for example, have an external diameter of six inches, an internal diameter of five inches and a thickness of one-eighth inch. It will be understood that snap rings made of other materials, such as spring steel, may be used in place of the nylon snap rings shown.

Preferably, the eccentric 30 and the housing sections 38 and 40 are all aluminium extrusions to reduce the cost of manufacture of the eccentric assembly. The eccentric 30 may include an opening 36 to counterbalance the assembly about the shaft 22.

As can be seen most clearly from FIG. 2, the eccentric unit 20 is bolted to the beam 14 or 16 while the other eccentric unit 18 supports the opposite end of the beam but is not rigidly connected thereto. As will be seen from FIG. 3, the beam rests on the upper surface 30 of the housing of the eccentric assembly 18. Guide plates 56 are bolted to the upper surface 30 of the eccentric housing and overlie opposite edge portions of the lower flange of the beam. A free fit is provided between the lower flange of the beam and the guide plates 56. Preferably the guide plates 56 are made of nylon. This arrangement is desirable in order to prevent damage to the conveyor in the event that one of the two shafts 22 or 24 stops rotating while the other shaft is still positively driven. If both the eccentric units 18 and 20 are rigidly connected to the beams when one shaft stops rotating, the beams may be bent or the equipment otherwise damaged. However, by permitting sliding movement between one of the eccentric units and the beam this problem is avoided. If one of the shafts ceases to rotate in the present arrangement the beam merely slides on the wear plates 56 without further damage do become worn the equipment. 41

The eccentric construction of the present invention provides an easily serviced unit requiring a minimum of maintainance. The use of the nylon bearing pads 52 eliminates the necessity of lubricating the eccentric, eccentric housing assembly. When the bearing plates 52 do become worn it is necessary merely to remove the snap ring 54, slide the worn bearing unit 52 out of its slot 50, replace the worn unit with a new bearing unit 52, and reinsert the snap ring 54. Since the snap rings 54 also serve to retain the upper and lower housing sections 38 and 40, respectively, in their aligned operative position, the removal of both of the snap rings 54 permits the housing to be readily disassembled by merely sliding the lower housing section 40 along the axial direction of the shaft 22.

It should be understood that while only the best known embodiments of the invention have been illustrated and described in detail herein the invention is not so limited thereto or thereby. Reference should thus be had to the appended claims in determining the true scope of the invention.

I claim:

1. An eccentric assembly, comprising:

an eccentric adapted to be rigidly secured to a shaft;

first and second housing sections together defining a cylindrical through bore receiving the eccentric, the first and second housing sections having interlocking end portions permitting the sections to be engaged and disengaged from one another only by movement of one section relative to the other section in a direction parallel to the axis of the through bore;

releasable means for preventing movement of one housing section relative to the other housing section; and a plurality of bearing plates carried by the housing sections and engaging the cylindrical surface of the eccentric.

2. The eccentric assembly according to claim 1 wherein the bearing plates are received in grooves on the surface of the through bore of the housing members, the releasable means also retaining the bearing plates in operative position.

3. In combination with an eccentric carried by and rotating with a shaft, a housing surrounding the eccentric, comprising:

first and second housing sections each define one half a through bore receiving the eccentric, one of the housing sections having end portions including outwardly projecting lugs, the other of the housing sections having end portions including grooves extending parallel to the axis of the shaft and complimentary to the lugs whereby the sections are engaged and disengaged from one another by sliding movement in a direction parallel to the axis of the shaft, each of the housing sections being provided with a pair of grooves on the semicylindrical face of the section, the grooves being parallel to one another and spaced apart by a distance substantially equal to but not less than the thickness of the eccentric; and releasable means comprising snap rings received in the grooves for preventing sliding movement of one housing section relative to the other section when the sections are aligned to form the through bore.

4. The assembly according to claim 3 further including a plurality of bearing plates located at spaced intervals on the surface of the through bore for engaging the cylindrical surface of the eccentric.

5. The assembly according to claim 4 wherein the housing sections are provided with slots on the cylindrical surface thereof for receiving the bearing plates and wherein the bearing plates are retained between the snap rings.

6. The assembly according to claim 5 wherein the bearing plates are nylon.

7. In a walking beam conveyor having a frame, a pair of shafts extending in parallel relation, first and second series of beams all extending parallel to one another at right angles to the shafts, eccentric assembles connecting the beams to the shafts with the beams of the first series being connected at 180° phase relation to and alternating with the beams of the second series, the improved eccentric housing, comprising:
- first and second housing sections each defining one half a through bore receiving the eccentric, one of the housing sections having end portions including radially outwardly projecting lugs, the other of the housing sections having end portions including grooves extending parallel to the axis of the shaft and complimentary to the lugs whereby the sections are engaged and disengaged from one another by sliding movement in a direction parallel to the axis of the shaft; and
- releasable means for preventing sliding movement of one housing section relative to the other section when the sections are aligned to form the through bore.

8. The improvement according to claim 7 wherein one of the housing sections includes a flat top portion adapted to engage the beam, the housings associated with one shaft being rigidly connected to the respective beams, the housings associated with the other shaft having sliding relation with the respective beams.

9. An eccentric assembly, comprising:
- an eccentric adapted to be rigidly secured to a shaft;
- first and second housing sections together defining a cylindrical through bore receiving the eccentric, the first and second housing sections having interlocking end portions permitting the sections to be engaged and disengaged from one another only by movement of one section relative to the other section in a direction parallel to the axis of the through bore, an annular groove being provided in the surface of the through bore on each side of the eccentric; and
- releasable means comprising snap rings received in the annular grooves for preventing movement of one housing section relative to the other housing section.

* * * * *